US009852072B2

United States Patent
Sehgal et al.

(10) Patent No.: US 9,852,072 B2
(45) Date of Patent: Dec. 26, 2017

(54) METHODS FOR HOST-SIDE CACHING AND APPLICATION CONSISTENT WRITEBACK RESTORE AND DEVICES THEREOF

(71) Applicant: NetApp, Inc., Sunnyvale, CA (US)

(72) Inventors: Priya Sehgal, Pune (IN); Sourav Basu, Kolkata (IN)

(73) Assignee: NetApp, Inc., Sunnyvale, CA (US)

( * ) Notice: Subject to any disclaimer, the term of this patent is extended or adjusted under 35 U.S.C. 154(b) by 27 days.

(21) Appl. No.: 14/790,701

(22) Filed: Jul. 2, 2015

(65) Prior Publication Data

US 2017/0004082 A1    Jan. 5, 2017

(51) Int. Cl.
    *G06F 12/0815*      (2016.01)
    *G06F 12/0813*      (2016.01)
    *H04L 29/08*      (2006.01)

(52) U.S. Cl.
    CPC ...... *G06F 12/0815* (2013.01); *G06F 12/0813* (2013.01); *H04L 67/2842* (2013.01); *G06F 2212/154* (2013.01); *G06F 2212/621* (2013.01)

(58) Field of Classification Search
    CPC .................................................. G06F 12/0815
    See application file for complete search history.

(56) References Cited

U.S. PATENT DOCUMENTS

| | | | | |
|---|---|---|---|---|
| 5,404,482 A * | 4/1995 | Stamm | .................. | G06F 9/3836 711/108 |
| 5,920,891 A * | 7/1999 | Steinbach | ........... | G06F 12/0835 710/110 |
| 6,070,231 A * | 5/2000 | Ottinger | .............. | G06F 12/0828 711/141 |
| 6,370,614 B1 * | 4/2002 | Teoman | .............. | G06F 12/0862 711/113 |
| 6,412,045 B1 * | 6/2002 | DeKoning | .......... | G06F 12/0804 711/133 |
| 6,463,509 B1 * | 10/2002 | Teoman | ................ | G06F 9/4401 711/113 |
| 7,062,675 B1 * | 6/2006 | Kemeny | ............. | G06F 11/1441 711/135 |
| 7,139,872 B1 * | 11/2006 | Bachmat | ............. | G06F 11/3447 711/113 |
| 7,389,393 B1 * | 6/2008 | Karr | ...................... | G06F 3/0613 711/103 |
| 7,480,778 B2 * | 1/2009 | Somavarapu | ......... | G06F 3/0605 711/100 |

(Continued)

*Primary Examiner* — Midys Rojas
*Assistant Examiner* — Khoa D Doan
(74) *Attorney, Agent, or Firm* — Cesari and McKenna, LLP

(57) ABSTRACT

A method, non-transitory computer readable medium, and device that assists with file-based host-side caching and application consistent write back includes receiving a write operation on a file from a client computing device. When the file for which the write operation has been received is determined when the file is present in the cache. An acknowledgement is sent back to the client computing device indicating the acceptance of the write operation when the file for which the write operation has been received is determined to be present within the cache. The write-back operation is completed for data present in the cache of the storage management computing device to one of the plurality of servers upon sending the acknowledgement.

20 Claims, 4 Drawing Sheets

(56) References Cited

U.S. PATENT DOCUMENTS

| | | | | |
|---|---|---|---|---|
| 7,636,814 B1* | 12/2009 | Karr | G06F 12/0804 | 711/143 |
| 8,327,080 B1* | 12/2012 | Der | G06F 12/0804 | 711/141 |
| 8,898,388 B1* | 11/2014 | Kimmel | G06F 12/0802 | 711/103 |
| 9,037,793 B1* | 5/2015 | O'Brien, III | G06F 3/0689 | 711/114 |
| 9,673,985 B2* | 6/2017 | Mangalampalli | H04L 9/3247 | |
| 2001/0014929 A1* | 8/2001 | Taroda | G06F 3/0601 | 711/4 |
| 2001/0049773 A1* | 12/2001 | Bhavsar | G06F 12/0813 | 711/147 |
| 2002/0073269 A1* | 6/2002 | Kawashima | G06F 3/0626 | 711/100 |
| 2002/0073277 A1* | 6/2002 | Butterworth | G06F 12/0873 | 711/113 |
| 2002/0083271 A1* | 6/2002 | Mounes-Toussi | G06F 12/0808 | 711/133 |
| 2002/0103965 A1* | 8/2002 | Dawkins | G06F 12/122 | 711/113 |
| 2002/0194440 A1* | 12/2002 | Ghosh | G06F 9/30043 | 711/154 |
| 2003/0079085 A1* | 4/2003 | Ang | G06F 12/0817 | 711/122 |
| 2003/0110357 A1* | 6/2003 | Nguyen | G06F 12/122 | 711/136 |
| 2007/0165042 A1* | 7/2007 | Yagi | G06F 12/0875 | 345/557 |
| 2007/0185852 A1* | 8/2007 | Erofeev | G06F 17/30123 | |
| 2008/0005464 A1* | 1/2008 | Lubbers | G06F 12/0804 | 711/113 |
| 2008/0162843 A1* | 7/2008 | Davis | G06F 3/0608 | 711/162 |
| 2008/0294859 A1* | 11/2008 | Nguyen | G06F 11/1451 | 711/162 |
| 2009/0006606 A1* | 1/2009 | Lubbers | H04L 41/0893 | 709/224 |
| 2010/0115310 A1* | 5/2010 | Kubota | G06F 3/0625 | 713/320 |
| 2010/0199042 A1* | 8/2010 | Bates | G06F 11/2064 | 711/114 |
| 2010/0318747 A1* | 12/2010 | Abts | G06F 12/0804 | 711/144 |
| 2011/0049773 A1* | 3/2011 | Kiefer | B21C 47/26 | 266/249 |
| 2011/0161295 A1* | 6/2011 | Ngo | G06F 11/1471 | 707/639 |
| 2011/0208921 A1* | 8/2011 | Pohlack | G06F 9/467 | 711/147 |
| 2012/0246410 A1* | 9/2012 | Xu | G06F 12/0895 | 711/128 |
| 2013/0086330 A1* | 4/2013 | Baddepudi | G06F 12/0868 | 711/143 |
| 2014/0122809 A1* | 5/2014 | Robertson | G06F 12/084 | 711/141 |
| 2016/0085695 A1* | 3/2016 | Leslie-Hurd | G06F 12/1441 | 711/163 |

* cited by examiner

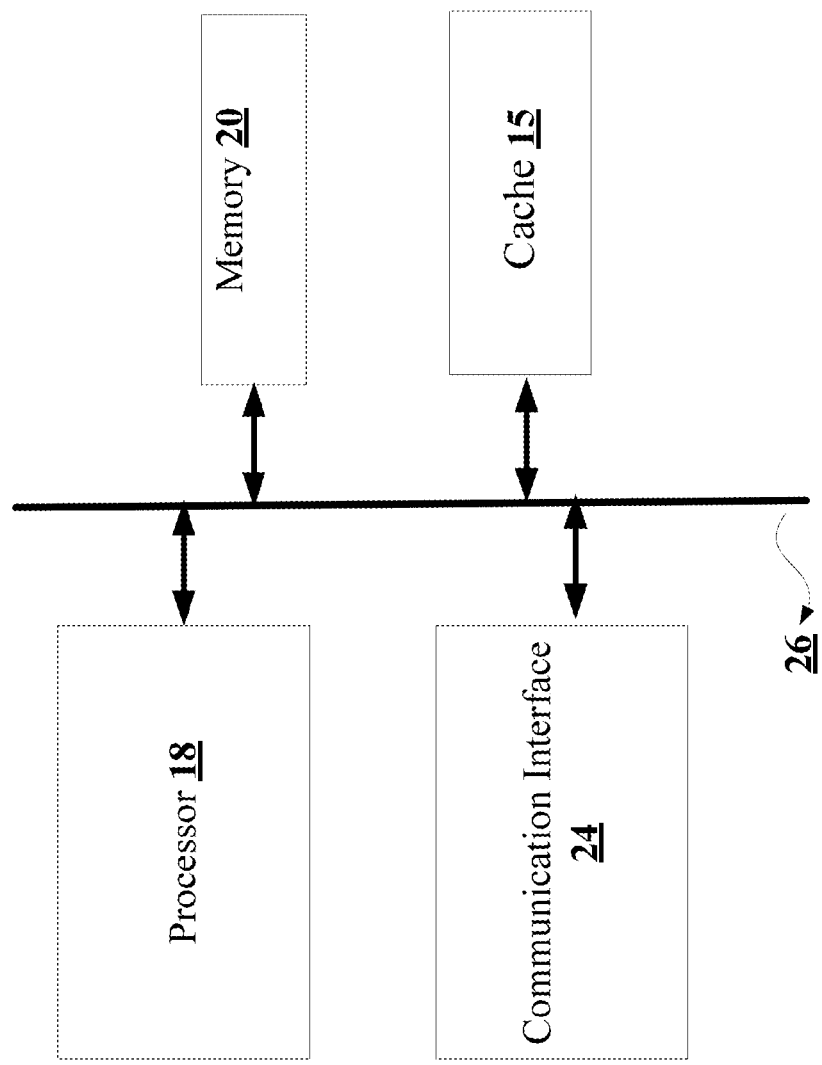

METHODS FOR HOST-SIDE CACHING AND APPLICATION CONSISTENT WRITEBACK RESTORE AND DEVICES THEREOF

FIELD

This technology generally relates to data storage management and, more particularly, methods for host-side caching and application consistent write back restore and devices thereof.

BACKGROUND

Cache devices are storage devices that are used to allow data to be accessed more quickly in a system. Caches can significantly improve performance in systems by reducing the input/output (I/O) time for operations that use the data in the cache. Generally, the cache is implemented in front of another storage device which has greater storage capacity, but slower I/O times, than the cache device. The benefits of caches are well understood and caches have been implemented advantageously in a variety of contexts and scales ranging from the caches in CPUs to caches in storage area networks (SANs).

Prior solutions are write-through, i.e., they acknowledge the user writes only after the data is written to the backend and therefore there is no caching taking place. This means that write-intensive workloads do not benefit from host-side caching solutions. In contrast, with prior technologies only read-intensive applications can reap the benefit of the host-side cache.

Additionally, with large caches at the storage management devices, any corruption or failure in the cached data results in difficulty to determine what portions of the data present in the cache are invalid and should be fetched from the backend. Prior technologies use methods that may unnecessarily invalidate valid data and require data transfers that result in wasting of network bandwidth.

SUMMARY

A method for file-based host-side caching and application consistent write back includes receiving, by a storage management computing device, a write operation on a file from a client computing device. When the file for which the write operation has been received is determined when the file is present in the cache by the storage management computing device. An acknowledgement is sent by the storage management computing device back to the client computing device indicating the acceptance of the write operation when the file for which the write operation has been received is determined to be present within the cache. The write-back operation is completed by the storage management computing device for data present in the cache of the storage management computing device to one of the plurality of servers upon sending the acknowledgement.

A non-transitory computer readable medium having stored thereon instructions for file-based host-side caching and application consistent write back comprising executable code which when executed by a processor, causes the processor to perform steps includes receiving a write operation on a file from a client computing device. When the file for which the write operation has been received is determined when the file is present in the cache. An acknowledgement is sent back to the client computing device indicating the acceptance of the write operation when the file for which the write operation has been received is determined to be present within the cache. The write-back operation is completed for data present in the cache of the storage management computing device to one of the plurality of servers upon sending the acknowledgement.

A storage management computing device includes a processor and a memory coupled to the processor which is configured to be capable of executing programmed instructions comprising and stored in the memory to receive a write operation on a file from a client computing device. When the file for which the write operation has been received is determined when the file is present in the cache. An acknowledgement is sent back to the client computing device indicating the acceptance of the write operation when the file for which the write operation has been received is determined to be present within the cache. The write-back operation is completed for data present in the cache of the storage management computing device to one of the plurality of servers upon sending the acknowledgement.

This technology provides a number of advantages including providing methods, non-transitory computer readable medium and devices for effective file-based host-side caching and application consistent write back. This technology provides an effective write-back cache mechanism by transferring only the application consistent data to the plurality of storage servers and after each data transfer takes a snapshot of the corresponding volume. Additionally, by storing the information during the transfer of data, the technology disclosed does not hinder the performance of the application executing on the plurality of client computing devices as they achieve close to host-side performance even during write intensive workloads.

BRIEF DESCRIPTION OF THE DRAWINGS

FIG. 2 is a block diagram of the exemplary storage management computing device shown in FIG. 1.

DETAILED DESCRIPTION

Figure 1:
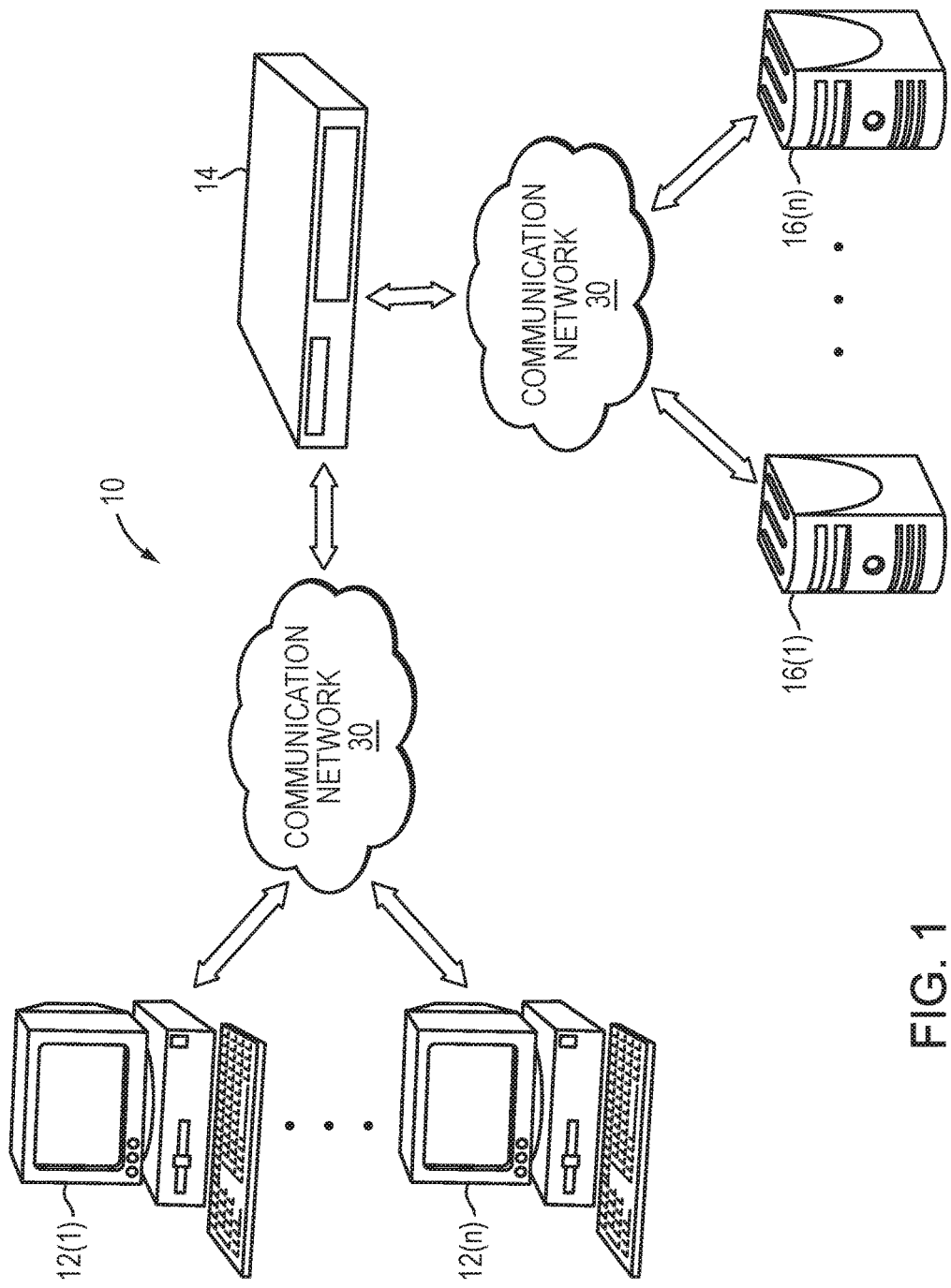
FIG. 1 is a block diagram of an environment with an exemplary storage management computing device.
Figure 3A:
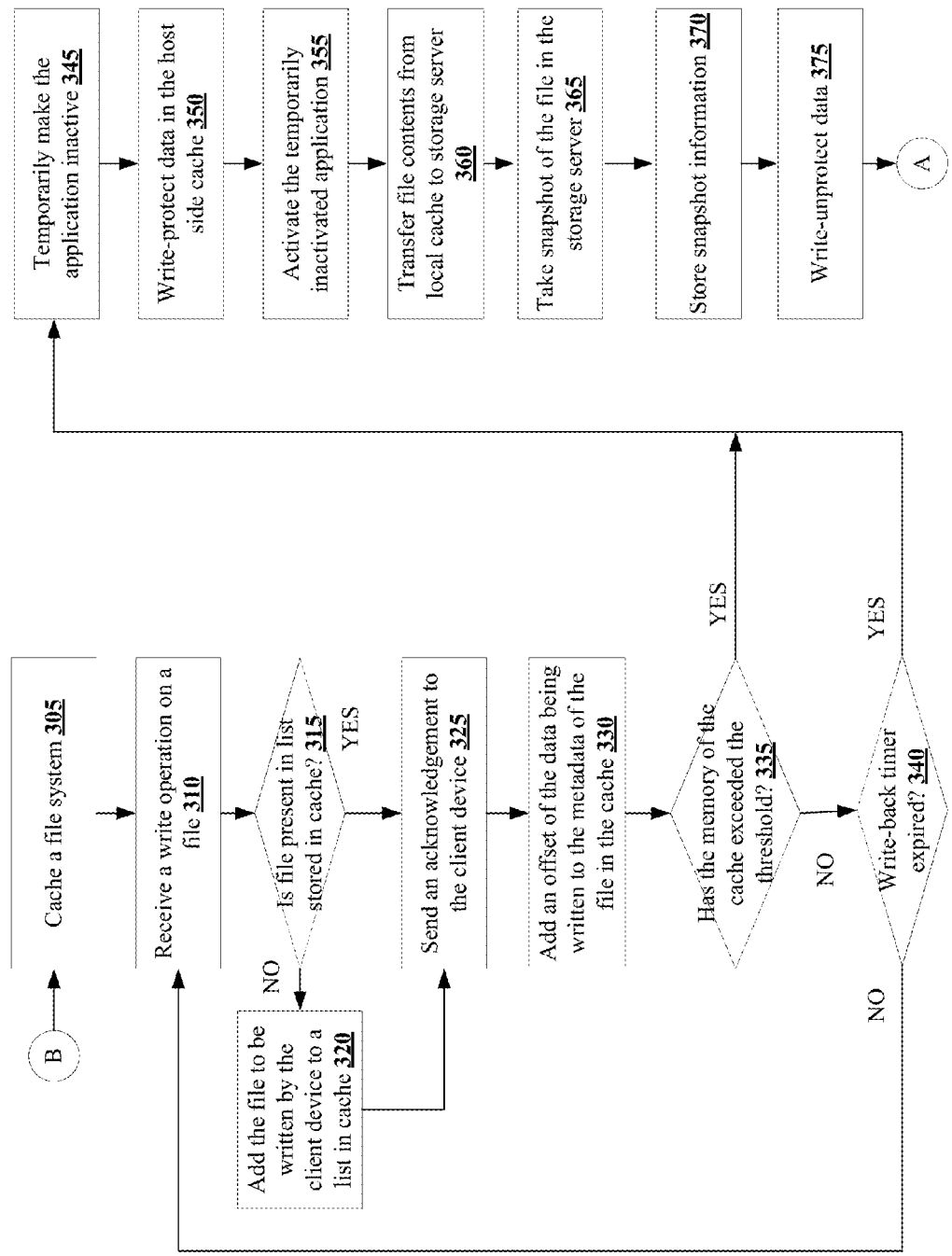
FIGS. 3A-3B are flow charts of an example of a method for file-based host-side caching and application consistent write back and fast restore.
Figure 3B:
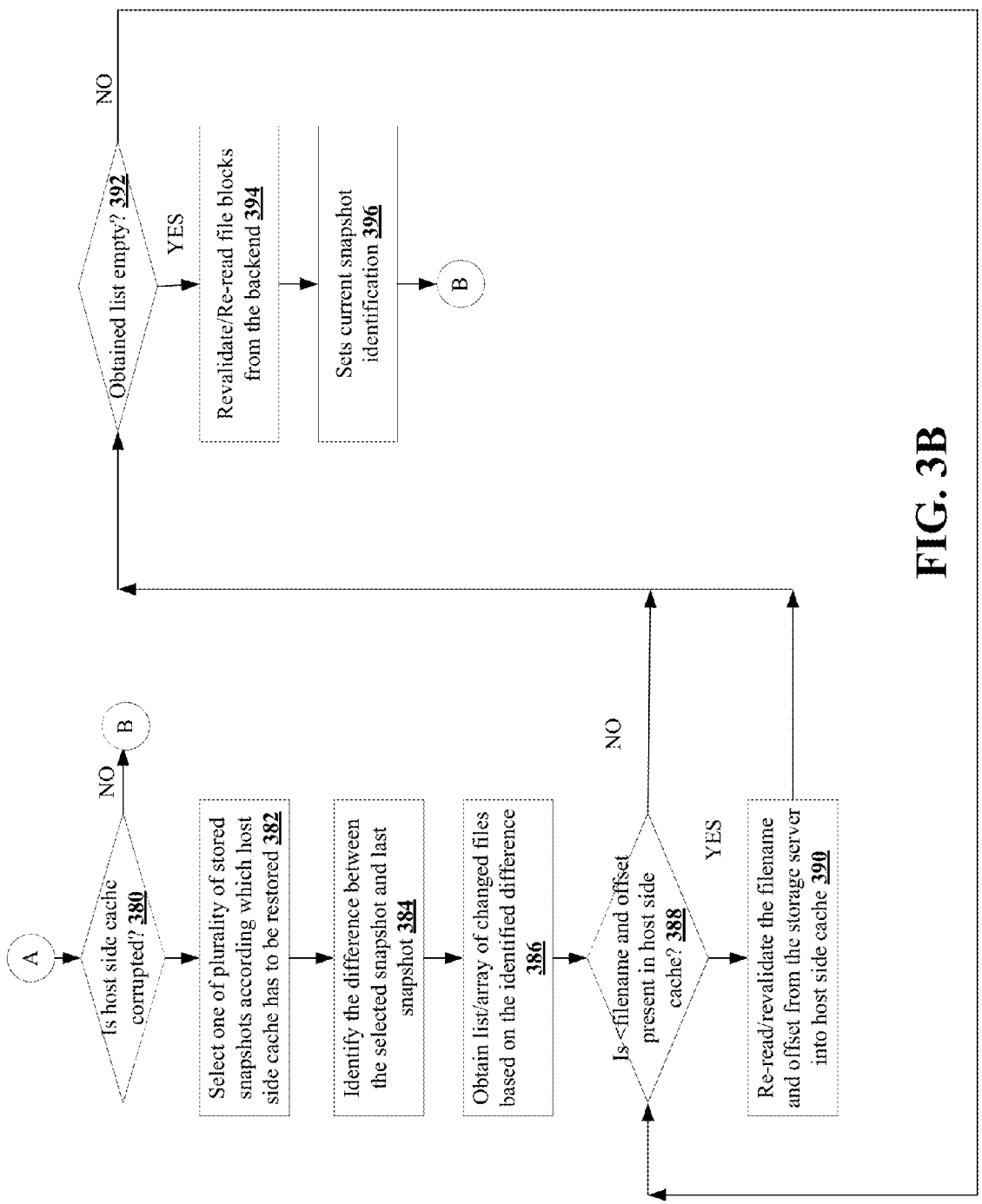

An environment 10 with a plurality of client computing devices 12(1)-12(n), an exemplary storage management computing device 14, a plurality of storage servers 16(1)-16(n) is illustrated in FIG. 1. In this particular example, the environment 10 in FIG. 1 includes the plurality of client computing devices 12(1)-12(n), the storage management computing device 14 and a plurality of storage servers 16(1)-16(n) coupled via one or more communication networks 30, although the environment could include other types and numbers of systems, devices, components, and/or other elements. In this example, the method for file-based host-side caching and application consistent write back and fast restore is executed by the storage management computing device 14 although the approaches illustrated and described herein could be executed by other systems and devices. The environment 10 may include other types and numbers of other network elements and devices, as is generally known in the art and will not be illustrated or described herein. This technology provides a number of advantages including providing methods, non-transitory computer readable medium and devices for effective file-based host-side caching and application consistent write back and fast restore.

Referring to FIG. 2, in this example the storage management computing device 14 includes a cache 15, processor 18, a memory 20, and a communication interface 24 which are coupled together by a bus 26, although the storage management computing device 14 may include other types and numbers of elements in other configurations.

The processor 18 of the storage management computing device 14 may execute one or more programmed instructions stored in the memory 20 for staging area for file-based host-side caching and application consistent write back as illustrated and described in the examples herein, although other types and numbers of functions and/or other operation can be performed. The processor 18 of the storage management computing device 14 may include one or more central processing units ("CPUs") or general purpose processors with one or more processing cores, such as AMD® processor(s), although other types of processor(s) could be used (e.g., Intel®).

The memory 20 of the storage management computing device 14 stores the programmed instructions and other data for one or more aspects of the present technology as described and illustrated herein, although some or all of the programmed instructions could be stored and executed elsewhere. A variety of different types of memory storage devices, such as a non-volatile memory, random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 18, can be used for the memory 20.

Additionally, as illustrated in FIG. 2, the storage management computing device 14 includes a cache 15 that assists with storing data that can be served faster. By way of example only, the cache 15 can be a non-volatile memory, or a flash memory to assist the storage management computing device 14 to quickly provide the data, although the cache 15 can be other types of memory devices.

The communication interface 24 of the storage management computing device 14 operatively couples and communicates with the plurality of client computing devices 12(1)-12(n) and the plurality of storage servers 16(1)-16(n), which are all coupled together by the communication network 30, although other types and numbers of communication networks or systems with other types and numbers of connections and configurations to other devices and elements. By way of example only, the communication network 30 can use TCP/IP over Ethernet and industry-standard protocols, including NFS, CIFS, SOAP, XML, LDAP, and SNMP, although other types and numbers of communication networks, can be used. The communication networks 30 in this example may employ any suitable interface mechanisms and network communication technologies, including, for example, any local area network, any wide area network (e.g., Internet), teletraffic in any suitable form (e.g., voice, modem, and the like), Public Switched Telephone Network (PSTNs), Ethernet-based Packet Data Networks (PDNs), and any combinations thereof and the like. In this example, the bus 26 is a universal serial bus, although other bus types and links may be used, such as PCI-Express or hyper-transport bus.

Each of the plurality of client computing devices 12(1)-12(n) includes a central processing unit (CPU) or processor, a memory, an interface device, and an I/O system, which are coupled together by a bus or other link, although other numbers and types of network devices could be used. The plurality of client computing devices 12(1)-12(n) communicates with the storage management computing device 14 to store files and data in the plurality of storage servers 16(1)-16(n), although the client computing devices 12(1)-12(n) can interact with the storage management computing device 14 for other purposes. By way of example, the plurality of client computing devices 12(1)-12(n) may run interface application(s) that may provide an interface to make requests to access, modify, delete, edit, read or write data within storage management computing device 14 or the plurality of storage servers 16(1)-16(n) via the communication network 30.

Each of the plurality of storage servers 16(1)-16(n) includes a central processing unit (CPU) or processor, a memory, an interface device, and an I/O system, which are coupled together by a bus or other link, although other numbers and types of network devices could be used. Each of the plurality of storage servers 16(1)-16(n) assist with storing of files and data from the plurality of client computing devices 12(1)-12(n) or the storage management computing device 14, although the plurality of storage servers 16(1)-16(n) can assist with other types of operations. In this example, each of the plurality of storage servers 16(1)-16(n) can be spread across different geographical locations. In another example, all of the plurality of storage servers 16(1)-16(n) can be present in one geographical location. Various network processing applications, such as CIFS applications, NFS applications, HTTP Web Data storage device applications, and/or FTP applications, may be operating on the plurality of storage servers 16(1)-16(n) and transmitting data (e.g., files or web pages) in response to requests from the storage management computing device 14 and the plurality of client computing devices 12(1)-12(n). It is to be understood that the plurality of storage servers 16(1)-16(n) may be hardware or software or may represent a system with multiple external resource servers, which may include internal or external networks.

Although the exemplary network environment 10 includes the plurality of client computing devices 12(1)-12(n), the storage management computing device 14, and the plurality of storage servers 16(1)-16(n) described and illustrated herein, other types and numbers of systems, devices, components, and/or other elements in other topologies can be used. It is to be understood that the systems of the examples described herein are for exemplary purposes, as many variations of the specific hardware and software used to implement the examples are possible, as will be appreciated by those of ordinary skill in the art.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as a non-transitory computer readable medium having instructions stored thereon for one or more aspects of the present technology as described and illustrated by way of the examples herein, as described herein, which when executed by the processor, cause the processor to carry out the steps necessary to implement the methods of this technology as described and illustrated with the examples herein.

An example of a method for file-based host-side caching and application consistent write back and fast restore will now be described herein with reference to FIGS. 1-3B. The exemplary method beings at step 305 where the storage management computing device 14 storing a file system from one of the plurality of storage servers 16(1)-16(n) in the cache 15 of the storage management computing device 14, although the storage management computing device 14 can cache the file system from other devices such as the plurality of client computing devices 12(1)-12(n). In this example and for purpose of further illustration, the storage management computing device 14 caches hot portions (frequently used or recently edited) of file 1 and file 2 and the storage management computing device 14 maintains all the metadata associated with the cached files 1 and 2, although the storage management computing device 14 can cache other types and/or amounts of files or other data.

Next in step 310, the storage management computing device 14 receives a write operation from an application executing in one of the plurality of client computing devices 12(1)-12(n) to write the data in the file. By way of example only, the storage management computing device 14 identifies when the one of the plurality of client computing devices 12(1)-12(n) opens and edits the file 1 and/or file 2 of the file system, although the storage management computing device 14 can identify that the data is being written to the file using other techniques. Alternatively, the storage management computing device 14 can also receive a read operation from an application executing in one of the plurality of client computing devices 12(1)-12(n).

Next in step 315, the storage management computing device 14 determines when the file that is being written is present in the cache 15 of the storage management computing device 14. In this example, the storage management computing device 14 includes a list of all files and the metadata associated with the file in the cache 15 and the storage management computing device 14 uses the information in the list to determine when the file is present within the cache 15, although the storage management computing device 14 can use other techniques to make this determination. Accordingly, when the storage management computing device 14 determines that the file is not present in the cache 15, then the No branch is taken to step 320. Alternatively, when the storage management computing device 14 receives a read request for an application executing within one of the plurality of client computing devices 12(1)-12(n), the storage management computing device 14 determines when the requested data in the read operation is present in the cache 15. Accordingly, when the storage management computing device 14 determines that the requested data for read operation is present in the cache 15, then the storage management computing device 14 provides the data from the cache 15 to complete the read operation. However, when the storage management computing device 14 determines that the requested data for the read operation is not present in the cache 15, then the storage management computing device 14 proceeds to obtain the requested data for read operation from one of the plurality of storage servers 16(1)-16(n).

In step 320, the storage management computing device 14 obtains the file to be written from one of the plurality of storage servers 16(1)-16(n) and caches the obtained file within the cache 15 of the storage management computing device 14. In this example, once the storage management computing device 14 caches the file in the cache 15 of the storage management computing device 14, the storage management computing device 14 allows the received write operation to be performed on the obtained and cached file. Additionally, the storage management computing device 14 adds the obtained file to the list indicating that the file is present in the cache 15 of the storage management computing device 14 and the exemplary flow proceeds to step 325.

However, if back in step 315, the storage management computing device 14 determines that the file is present in the list stored in the cache 15, then the Yes branch is taken to step 325. In step 325, the storage management computing device 14 sends an acknowledgement to the one of the plurality of client computing devices 12(1)-12(n) when the data is being written in the file stored in the cached file system. By way of example only, the storage management computing device 14 sends an acknowledgement to one of the plurality of client computing devices 12(1)-12(n) as and when the data is being written to the file, although the storage management computing device 14 can also send the acknowledgement once the all the data has been written to the file.

In step 330, the storage management computing device 14 adds an offset of the data being written to the metadata of the file in the cache 15. In this example, each file present in the cache 15 of the storage management computing device 14 includes a file inode indicator list and the file inode indicator list includes two types of data pointers each containing 4 k of data. One of the data pointers in the file inode indicator list includes a valid data location on the storage management computing device. By way of example, the valid data location is represented as zero (0) when the file that is being written is not present in the cache 15 and is required to be obtained from one of the plurality of storage servers 16(1)-16(n). Accordingly in this example, the storage management computing device 14 adds an offset of 0, 4 k to the valid data location pointer in the file inode indicator list when the data being written to the metadata of the file in the cache 15. By way of example, the storage management computing device 14 adds 0, 4 k to the file inode indicator list of file1 when the data is being written to the file1 present in the cache 15 of the storage management computing device.

In step 335, the storage management computing device 14 determines when the memory size of the cache 15 has exceeded a threshold value due to the data that is being written in the previous step. In this example, the cache 15 has a threshold size of the memory that can be cached and every time there is a write operation that is being performed on the file in the cache 15, the current size of the cache 15 increases based on the amount of data being written. Accordingly, when the storage management computing device 14 determines that the memory size of cache 15 exceeds the threshold size, then the Yes branch is taken to step 345 which will be further illustrated below. However, when the storage management computing device 14 determines that the memory size of the cache 15 has not exceeded the threshold value, then the No branch is taken to step 340.

In step 340, the storage management computing device 14 determines when the write-back timer of the storage management computing device 14 has expired. In this example, the write-back timer relates to timer that includes a periodic time at which the data in the cache 15 of the storage management computing device 14 is required to be transferred to the plurality of storage servers 16(1)-16(n). By way of example, the value of the write-back timer can be every sixty seconds or eighty seconds, although the write-back timer can be configured by other values. Accordingly, when the storage management computing device 14 determines that the write-back time has not expired, then the No branch is taken back to step 310. However, when the storage management computing device 14 determines that the write-back timer has expired, then the Yes branch is taken to step 345.

In step 345, the storage management computing device 14 temporarily designates the application executing in one of the plurality of client computing devices 12(1)-12(n) that intends to write the data in the file as inactive. By way of example only, all write operations received from the application executing in one of the plurality of client computing devices 12(1)-12(n) are blocked by the storage management computing device 14. In this example, the storage management computing device 14 is required to make the application executing in one of the plurality of client computing devices 12(1)-12(n) temporarily inactive because the size data that is being written by the application executing in one of the plurality of client computing devices 12(1)-12(n) into the file in cache 15 cannot be cached in the storage management computing device 14 as the memory size of the cache 15 is already above the threshold value or the write-back timer has expired.

In step 350, the storage management computing device 14 write-protects the current dirty file blocks which will be later transferred to the plurality of storage servers 16(1)-16(n) that will be further illustrated in step 360. In this example, write-protect relates to protecting data within a file offset from being written. By way of example only, if a file offset 100 of file 1 is in dirty list and needs to be send to the plurality of storage servers 16(1)-16(n), then the storage management computing device 14 write-protect this offset i.e., when the storage management computing device 14 receives a write operation from an application executing within one of the plurality of client computing devices 12(1)-12(n) to this offset 100 of file 1, the storage management computing device 14 will "copy-on-write" data to a new physical location on the cache 15 and it will not write in the same place (offset 100 of file 1).

Next in step 355, the storage management computing device 14 activates the temporarily inactivated application executing in one of the plurality of client computing devices 12(1)-12(n), so that the storage management computing device 14 can start receiving read/write operations from the application executing in one of the plurality of client computing devices 12(1)-12(n).

In step 360, the storage management computing device 14 transfers the file contents from the cache 15 in the storage management computing device 14 to one of the plurality of storage servers 16(1)-16(n). In this example, the storage management computing device 14 transfers or flushes the file contents from the cache storage list that includes all the data blocks that were present in the cache 15 the storage management computing device 14 that have been changed since the last time the snapshot was taken, although the storage management computing device 14 can transfer other types or amounts of information to the plurality of storage servers 16(1)-16(n). While the storage management computing device 14 receives a subsequent write operation from the application executing on one of the plurality of client computing devices 12(1)-12(n) while transferring the data from the cache to the plurality of storage servers 16(1)-16(n), the storage management computing device 14 stores the data that is being written into the file in the cache 15 in a copied on write list. The data present in the copied on write list will be transferred to the one of the plurality of storage servers 16(1)-16(n) once the original data present in the cache 15 has been transferred to the plurality of storage servers 16(1)-16(n).

In step 365, once the data has been transferred from the cache 15 to one of the plurality of storage servers 16(1)-16(n), the storage management computing device 14 takes a snapshot of the file and the file system in the one of the plurality of storage servers 16(1)-16(n) to which the data had been transferred. In this example, taking a snapshot relates to capturing information in the cache 15, such as all the files, file structure, and file system metadata associated with all the files, although the snapshot can include other types and/or amounts of data. In this example, the storage management computing device 14 takes the backup snapshot of the file and the file system in the plurality of storage servers 16(1)-16(n) to use the snapshot when the cache 15 in the storage management computing device 14 fails or becomes temporarily inactive. By way of example only, the storage management computing device 14 can compare the previous snapshot against a current snapshot that can be taken after the cache 15 in the storage management computing device 14 is active. When the storage management computing device 14 identifies changes to the file or file system based on the snapshot comparison, the storage management computing device 14 fetches the changed information identified from the corresponding file in one of the plurality of storage servers 16(1)-16(n). Using this technique, the storage management computing device 14 is able to provide fast re-validation and restore during host-side caching of the data being written by an application executing in one of the plurality of client computing devices 12(1)-12(n) into the cached file stored in the cache 15 of the storage management computing device 14.

In step 370, the storage management computing device 14 stores the snapshot of one of the plurality of storage servers 16(1)-16(n) within the memory 20, although the storage management computing device 14 can store the snapshot at other memory locations.

In step 375, the storage management computing device 14 performs write-unprotect on the file and other contents present within the cache 15. By way of example only, write-unprotect relates to disabling copy-on-write feature on the file offsets.

In step 380, the storage management computing device 14 determines when the cache 15 is corrupted or the data inside the cache 15 is deleted. By way of example only, the storage management computing device 14 determines that the cache 15 is corrupted when a file within the cache 15 is accidently deleted or a virus has corrupted a file within the cache 15. Accordingly, when the storage management computing device 14 determines that the cache 15 is not corrupted, then the No branch is taken back to step 305. However, when the storage management computing device 14 determines that the cache is corrupted, then the Yes branch is taken to step 382.

In step 382, the storage management computing device 14 selects one of the plurality of stored snapshots stored in one of the plurality of storage servers 16(1)-16(n) according to which cache 15 is to be restored, although the storage management computing device 14 can select one of the plurality of stored snapshots using other parameters.

In step 384, the storage management computing device 14 identifies the difference between the selected consistent snapshot (snapshot that does include corrupted data) and the most recent snapshot by comparing the information present in the selected snapshot and the most recent snapshot, although the storage management computing device 14 can identify the difference using other techniques.

In step 386, the storage management computing device 14 obtains a list or array of changed files that are identified based on the difference. In this example, the obtained list or array of changed files includes filename and offset at which the contents of the file(s) have been changed, although the obtained list or array of changed files can include other types or amounts of information.

Next in step 388, the storage management computing device 14 for each entry of the filename and offset present in the obtained list or array, determines when the file(s) having the same filename and offset in cache 15 includes the identified changes. Accordingly, when the storage management computing device 14 determines that the filename and offset is not present in the cache 15, then the No branch is taken to step 392 which will be further illustrated below. However, when the storage management computing device 14 determines that the filename and offset is present in the cache 15, then the Yes branch is taken to step 390.

In step 390, the storage management computing device 14 re-validates or re-reads the filename and offset from the one of the plurality of storage servers 16(1)-16(n) into the cache 15.

Next in step 392, the storage management computing device 14 determines when all the entries in the obtained list or array of changed files have been traversed. When the storage management computing device 14 determines that all the entries has not been traversed, then the No branch is taken back to step 388. However, when the storage management computing device 14 determines that all the entries have been traversed, then the Yes branch is taken to step 394.

In step 394, the storage management computing device 14 re-validates the file offset in the obtained list of list or array of changed files.

In step 396, the storage management computing device 14 sets the current snapshot identification for cache 15 as consistent snapshot identification so that it can be used for subsequent comparisons to identify the differences when the cache is corrupted.

By using the techniques illustrated above, the technology provides an effective write-back cache mechanism by transferring only the application (executing on one of the plurality of client computing devices) consistent data to the plurality of storage servers and after each data transfer takes a snapshot of the corresponding volume. Additionally, by storing the information in a copied on write list during the transfer of data, the technology disclosed does not hinder the performance of the application executing on the plurality of client computing devices is also not hindered as they achieve close to host-side performance even during write intensive workloads.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method comprising:
   receiving, by a computing device, a first write operation having an offset and first data directed to a file from an application executing on a client computing device;
   determining, by the computing device, when the file is present in a cache of the computing device;
   sending, by the computing device, an acknowledgement of the first write operation to the client computing device, when the file is determined to be present in the cache and the first data is written to the file in the cache;
   adding, by the computing device, the offset to a dirty list;
   blocking processing, by the computing device, of a second write operation directed to the file and having second data received from the application executing on the client computing device;
   write-protecting, by the computing device, the offset of the dirty list upon receiving the second write operation;
   resuming processing, by the computing device, of the second write operation;
   completing, by the computing device, a write-back operation for the first data present in the cache to a storage server upon sending the acknowledgement; and
   write-unprotecting, by the computing device, the offset of the dirty list when the write-back operation is complete.

2. The method of claim 1 wherein determining when the file is present in the cache further comprises, obtaining and caching, by the computing device, the file from the storage server when the file is not determined to be present in the cache.

3. The method of claim 1 wherein completing the write-back operation further comprises:
   determining, by the computing device, when a current memory size of the cache exceeds a threshold based on the second data being written to the file in the cache; and
   determining, by the computing device, when a write-back timer has expired on the cache.

4. The method of claim 3 further comprising:
   temporarily designating, by the computing device, a status of the application executing in the client computing device issuing the write operations directed to the file as inactive; and
   in response to write-protecting the offset of the dirty list, changing, by the computing device the status of the application executing in the client computing device to active.

5. The method of claim 1 further comprising:
   capturing, by the computing device, a snapshot of the file in the storage server upon the completion of the write-back operation.

6. The method of claim 5 further comprising:
   determining, by the computing device, when there is a failure of the cache of the computing device; and
   re-validating, by the computing device, the first data present in the failed cache using the captured snapshot.

7. A non-transitory computer readable medium having stored thereon instructions including executable code configured to perform steps comprising:
   receiving a first write operation having an offset and first data directed to a file from an application executing on a client computing device;
   determining when the file is present in a cache of a computing device;
   sending an acknowledgement of the first write operation to the client computing device, when the file is determined to be present in the cache and the first data is written to the file in the cache;

adding the offset to a dirty list;

blocking processing of a second write operation directed to the file and having second data received from the application executing on the client computing device;

write-protecting the offset of the dirty list upon receiving the second write operation;

resuming processing of the second write operation;

completing a write-back operation for the first data present in the cache to a storage server upon sending the acknowledgement; and write-unprotecting the offset of the dirty list when the write-back operation is complete.

8. The non-transitory computer readable medium of claim 7 wherein the step of determining when the file is present in the cache further comprises, obtaining and caching the file from the storage server in the cache of the computing device when the file is not determined to be present in the cache.

9. The non-transitory computer readable medium of claim 7 wherein the step of completing the write-back operation further comprises:

determining when a current memory size of the cache exceeds a threshold based on the second data being written to the file in the cache; and determining when a write-back timer has expired on the cache.

10. The non-transitory computer readable medium of claim 9 wherein the stored instructions are further configured to perform steps comprising:

temporarily designating a status of the application executing in the client computing device issuing the write operations directed to the file as inactive; and in response to write protecting the offset of the dirty list, changing the status of the application executing in the client computing device to active.

11. The non-transitory computer readable medium of claim 7 wherein the stored instructions are further configured to perform a step comprising capturing a snapshot of the file in the storage server upon the completion of the write-back operation.

12. The non-transitory computer readable medium of claim 11 further comprising:

determining when there is a failure of the cache of the computing device; and re-validating the first data present in the failed cache using the captured snapshot.

13. A computing device comprising:

a processor;

a memory coupled to the processor, the memory including programmed instructions configured to:

receive a first write operation having an offset and first data directed to a file from an application executing on a client computing device;

determine when the file is present in a cache of the computing device;

send an acknowledgement of the first write operation to the client computing device when the file is determined to be present in the cache and the first data is written to the file in the cache;

add the offset to a dirty list;

block processing of a second write operation directed to the file and having second data received from the application executing on the client computing device;

write-protect the offset of the dirty list upon receiving the second write operation;

resume processing of the second write operation;

complete a write-back operation for the first data present in the cache to a storage server upon sending the acknowledgement; and write-unprotect the offset of the dirty list when the write-back operation is complete.

14. The computing device of claim 13 wherein the programmed instructions included in the memory are further configured to obtain and cache the file from the storage server to the cache of the computing device when the file is not determined to be present in the cache.

15. The computing device of claim 13 wherein the programmed instructions included in the memory configured to complete the write-back operation are further configured to:

determine when a current memory size of the cache exceeds a threshold based on the second data being written to the file in the cache; and determine when a write-back timer has expired on the cache.

16. The computing device of claim 15 wherein the programmed instructions included in the memory are further configured to:

determine a status of the application executing in the client computing device issuing the write operation directed to the file to inactive;

complete the write-back operation by transferring the first data from the cache to the storage server; and in response to write-protecting changes to the dirty list, change the status of the application executing in the client computing device to active upon the completion of the write-back operation.

17. The computing device of claim 13 wherein the programmed instructions included in the memory are further configured to capture a snapshot of the file in the storage server upon the completion of the write-back operation.

18. The computing device of claim 17 wherein the programmed instructions included in the memory are further configured to:

determine when there is a failure of the cache of the computing device; and re-validate the first data present in the failed cache using the captured snapshot.

19. The method of claim 1 wherein the first data is written to a first storage location and the second data is written to a second storage location different from the first storage location while the dirty list is write protected.

20. The computing device of claim 13 wherein the first data is written to a first storage location and the second data is written to a second storage location different from the first storage location while the dirty list is write protected.

* * * * *